United States Patent
Schumacher

(10) Patent No.: US 9,226,488 B2
(45) Date of Patent: Jan. 5, 2016

(54) INSECT TRAP AND MONITOR

(75) Inventor: Joseph Schumacher, Drumbo (CA)

(73) Assignee: Be-Gone Inc., New Dundee, Ontario (CA)

( * ) Notice: Subject to any disclaimer, the term of this patent is extended or adjusted under 35 U.S.C. 154(b) by 640 days.

(21) Appl. No.: 13/415,262

(22) Filed: Mar. 8, 2012

(65) Prior Publication Data
US 2013/0232849 A1    Sep. 12, 2013

(51) Int. Cl.
*A01M 1/14* (2006.01)
*A01M 1/10* (2006.01)
*A01M 1/02* (2006.01)

(52) U.S. Cl.
CPC .................. *A01M 1/14* (2013.01); *A01M 1/026* (2013.01); *A01M 1/103* (2013.01)

(58) Field of Classification Search
CPC ......... A01M 1/10; A01M 1/14; A01M 1/103; A01M 1/026
USPC ............................................. 43/123, 114, 121
See application file for complete search history.

(56) References Cited

U.S. PATENT DOCUMENTS

| | | | | |
|---|---|---|---|---|
| 119,905 A * | 10/1871 | Wier | | 43/123 |
| 161,032 A * | 3/1875 | Hawkins | | 43/123 |
| 246,771 A * | 9/1881 | Hey | | 43/123 |
| 276,844 A * | 5/1883 | Manahan | | 43/114 |
| 391,930 A * | 10/1888 | Wilson | | 43/123 |
| 431,537 A * | 7/1890 | Trenner | | 43/114 |
| 481,270 A * | 8/1892 | Baggesen | | 43/123 |
| 537,060 A * | 4/1895 | Mitchamore | | 43/114 |
| 834,518 A * | 10/1906 | Grasser | | 43/123 |
| 1,081,363 A * | 12/1913 | Celene | | 43/123 |
| 1,201,720 A * | 10/1916 | Hagermann | | 43/123 |
| 1,223,016 A * | 4/1917 | Young | | 43/123 |
| 1,259,911 A * | 3/1918 | Seibert | | 43/131 |
| 1,261,842 A * | 4/1918 | Muller | | 43/123 |
| 1,357,267 A * | 11/1920 | Young | | 43/123 |
| 1,439,874 A * | 12/1922 | Dillin | | 43/123 |
| 1,566,179 A * | 12/1925 | Wilmarth | | 43/121 |
| 1,581,410 A * | 4/1926 | Welsh | | 43/123 |
| 2,177,670 A * | 10/1939 | Peirson | | 43/114 |
| 3,304,646 A * | 2/1967 | Staley | | 43/114 |
| 3,863,384 A * | 2/1975 | Weatherston et al. | | 43/114 |
| 3,968,590 A * | 7/1976 | Kitterman | | 43/114 |
| 4,217,722 A * | 8/1980 | McMullen | | 43/114 |

(Continued)

FOREIGN PATENT DOCUMENTS

| | | | | |
|---|---|---|---|---|
| DE | 19808745 A1 * | 9/1999 | ............ | A01M 1/10 |
| GB | 2166034 A * | 4/1986 | ............ | A01M 1/14 |

(Continued)

*Primary Examiner* — Darren W Ark
(74) *Attorney, Agent, or Firm* — James W. Hinton

(57) ABSTRACT

The invention describes an insect trap and monitor for trapping and monitoring crawling insects such as bed bugs. The trap comprises two planar elements of substantially the same size, each with flat outer surface and an inner surface provided with a plurality of recessed areas. The opposed recessed areas align to form at least one passageway and a plurality of trapping compartments, with the passageway open at least at one end to provide an entrance to the trap.
The trapping compartment are provided with adhesive means such as a non-drying, non-toxic adhesive.
The insect trap and monitor further comprises monitoring means for exposing the trapping compartments, such as a tear-off flap allowing for inspection of the interior of the trap before it is disposed.

9 Claims, 1 Drawing Sheet

(56) References Cited

U.S. PATENT DOCUMENTS

| | | | |
|---|---|---|---|
| 4,438,584 A * | 3/1984 | Baker et al. | 43/114 |
| 4,581,845 A * | 4/1986 | Burkholder et al. | 43/121 |
| 4,709,504 A * | 12/1987 | Andric | 43/114 |
| 4,819,371 A * | 4/1989 | Cohen | 43/114 |
| 4,841,669 A * | 6/1989 | Demarest et al. | 43/114 |
| 4,866,877 A * | 9/1989 | Barak | 43/121 |
| 5,042,194 A * | 8/1991 | Cohen | 43/107 |
| 5,119,586 A * | 6/1992 | Townsend | 43/114 |
| 5,157,866 A * | 10/1992 | Rosie | 43/121 |
| 5,394,640 A * | 3/1995 | Musket | 43/114 |
| 5,398,442 A * | 3/1995 | Musket | 43/114 |
| 5,438,792 A * | 8/1995 | Monett et al. | 43/114 |
| 5,454,186 A * | 10/1995 | Gang | 43/114 |
| 6,594,947 B2 * | 7/2003 | Lingren et al. | 43/114 |
| 7,676,985 B1 * | 3/2010 | Perkins | 43/114 |
| 8,413,370 B2 * | 4/2013 | Messian | 43/123 |
| 8,789,309 B2 * | 7/2014 | Fabry | 43/123 |
| 2002/0124457 A1 * | 9/2002 | Cosenza | 43/114 |
| 2006/0283076 A1 * | 12/2006 | Chambers et al. | 43/114 |
| 2007/0044372 A1 * | 3/2007 | Lang et al. | 43/114 |
| 2007/0193109 A1 * | 8/2007 | Chyun | 43/114 |
| 2008/0052982 A1 * | 3/2008 | Windsor | 43/114 |
| 2009/0223115 A1 * | 9/2009 | Lang et al. | 43/123 |
| 2010/0011655 A1 * | 1/2010 | Frisch | 43/114 |
| 2010/0043274 A1 * | 2/2010 | Battick | 43/114 |
| 2010/0043275 A1 * | 2/2010 | Battick | 43/114 |
| 2010/0212213 A1 * | 8/2010 | Hope et al. | 43/123 |
| 2012/0012046 A1 * | 1/2012 | Cain | 43/1 |
| 2012/0110894 A1 * | 5/2012 | Black et al. | 43/123 |
| 2012/0167309 A1 * | 7/2012 | Heidorn | 43/123 |
| 2012/0210628 A1 * | 8/2012 | Park et al. | 43/114 |
| 2012/0291336 A1 * | 11/2012 | Friend | 43/114 |
| 2013/0031825 A1 * | 2/2013 | Dass | 43/123 |
| 2013/0067796 A1 * | 3/2013 | Dong et al. | 43/114 |
| 2013/0145679 A1 * | 6/2013 | Nenninger | 43/114 |
| 2013/0145680 A1 * | 6/2013 | Soltis et al. | 43/114 |
| 2015/0007485 A1 * | 1/2015 | Hortel et al. | 43/114 |
| 2015/0216159 A1 * | 8/2015 | Vasudeva | 1/103 |
| 2015/0223442 A1 * | 8/2015 | Yamauchi et al. | 1/103 |

FOREIGN PATENT DOCUMENTS

| | | | | |
|---|---|---|---|---|
| JP | 07327573 A | * | 12/1995 | A01M 1/14 |
| JP | 11009130 A | * | 1/1999 | A01M 1/14 |
| JP | 2000135044 A | * | 5/2000 | A01M 1/14 |
| JP | 2000139315 A | * | 5/2000 | A01M 1/10 |
| JP | 2001120147 A | * | 5/2001 | A01M 1/14 |
| JP | 2002084957 A | * | 3/2002 | A01M 1/14 |
| JP | 2006075025 A | * | 3/2006 | A01M 1/14 |
| JP | 2006136296 A | * | 6/2006 | A01M 1/14 |
| JP | 2006280321 A | * | 10/2006 | A01M 1/14 |
| JP | 2010227049 A | * | 10/2010 | A01M 1/14 |
| JP | 2011036153 A | * | 2/2011 | A01M 1/14 |
| JP | 2012110316 A | * | 6/2012 | A01M 1/10 |
| JP | 2013146214 A | * | 8/2013 | A01M 1/14 |

* cited by examiner

INSECT TRAP AND MONITOR

FIELD OF THE INVENTION

The present invention relates to an insect trap and monitor and, more specifically, to a device for trapping and monitoring bed bugs.

BACKGROUND OF THE INVENTION

Bed bugs are blood-sucking insects belonging to the Cimicidae family. Both young bugs (nymphs) and adults feed on blood of humans and animals. There are several speciae of bed bugs, with *Cimex hemipterus* predominant in tropical regions and *C. lectularius* most commonly found in northern temperate regions of North America and Europe.

As taught in *Pest Notes: Bed Bugs* (Publication 7454, University of California, May 2009), bed bug infestations were relatively rare in North America and were thought to be associated with crowded and poorly managed housing. Recent resurgence, however, has spread infestation even to finest hotels and living accommodations. Reasons for this resurgence appear to involve increased human travel, movement of infested luggage and household items, and changes in regulations governing use of pesticides available to control this pest.

Adult bed bugs are flat-bodied, oval crawling insects, about ⅕ inch long and rusty red to mahogany in color. Nymphs have similar appearance but are smaller and have a thinner outer skeleton of a lighter, yellowish color. They are distinguished from another common blood-sucking species, conenose bugs, by smaller size, more rounded shape and lack of wings. Ability of bed bugs to survive without food for prolonged periods of time, sometimes even several months, makes infestation hard to control even in dwellings that have been left unoccupied.

Bed bugs usually feed at night and hide during the day. Common hiding places include seams in mattresses and box springs, cracks in bed frames, under loose wallpaper, behind picture frames, and inside furniture, upholstery and books. People can bring them into the home on clothing, bedding, luggage or firewood, and may occasionally pick them up in libraries, theaters, on buses and trains.

Although bed bugs are currently not considered to be disease carriers, and their bite seldom has consequences beyond itch and mild skin irritation, an almost epidemic spread of infestation in urban centers throughout North America has caused significant public concern. There is, therefore, a need for products that will control and monitor bed bug infestation.

A number of patent documents discuss devices for trapping crawling insects. Thus, for example, U.S. Pat. No. 3,304,646 to Staley describes a trap comprising a plurality of channels, with poison placed at the closed end of each channel. In the case of bed bugs, however, solutions involving use of poisonous materials are not advisable as bugs may bite humans and expose them to the poison before they die.

Other documents, e.g., U.S. Pat. No. 4,998,376 to Scherbak, describe traps comprising one-way flaps or gates the construction of which prevents trapped insects from returning the same way. Due to small size and flat bodies of bed bugs, this type of trap is not likely to be efficient.

U.S. Pat. No. 4,217,722 to McMullen, U.S. Pat. No. 4,208,828 to Hall et al., U.S. Pat. No. 4,244,134 to Otterson, U.S. Pat. No. 4,395,842 to Marguiles, U.S. Pat. No. 4,709,504 to Andric and U.S. Pat. No. 5,572,825 to Gehert, all describe insect traps comprising adhesive-covered inside surfaces. While this approach is environmentally friendly and safe for humans and pets, the specific solutions taught in above patents have serious drawbacks. In general, there is one central adhesive-covered surface where insects entrapped around the periphery of the surface will effectively block the advance of other insects. Moreover, other insects may be able to register trapped insects' distress signals, causing them to turn back. These shortcomings have been partially addressed in U.S. Pat. No. 5,438,792 to Monett et al., wherein the central adhesive-covered surface is accessed through a plurality of passageways, thereby allowing insects to remain separate before trapping.

Efficiency of adhesive traps depends on maintaining an enclosed volume of space in which insects may freely move from the entrance to the adhesive-covered surface. Bed bugs tend to infest hard-to-reach, narrow places, where most of traps according to above documents cannot be placed. Moreover, traps placed under mattresses, in luggage, or pockets, will be subjected to pressure and may be crushed, thereby collapsing the enclosed volume of space. In traps comprising multiple, opposed adhesive-covered surfaces, those surfaces may come in contact and adhere to each other, rendering the trap useless.

U.S. Pat. No. 7,591,099 to Lang et al. describes a device specifically meant for detection and, optionally, retention of bed bugs. While the device is of a sturdy, non-collapsible construction and provides a multitude of entrance passageways, it optionally features a single, central adhesive-covered surface. In addition, in the preferred embodiment, the device is meant to be used with a sophisticated monitoring system suitable for commercial establishments.

In spite of prior art solutions, there is still a need for an inexpensive, disposable and efficient device for trapping crawling insects, such as bed bugs, suitable for placement in mattresses and box springs, behind picture frames, under and inside furniture, in luggage, and articles of clothing. Such a device, which will also provide a convenient way of monitoring the infestation, is discussed and described in the present invention.

SUMMARY OF THE INVENTION

The insect trap and monitor of the invention is devised for trapping and monitoring crawling insects such as bed bugs. The trap comprises two planar elements of substantially the same size, each element comprising a substantially flat outer surface and an inner surface provided with a plurality of recessed areas, the elements being arranged in opposed relation and non-collapsibly joined together along their inner surfaces. The opposed recessed areas align to form at least one passageway and a plurality of trapping compartments, with the passageway open at least at one end to provide an entrance to the trap.

The compartment-forming recessed areas of at least one of the elements are provided with adhesive means for trapping the insects. In a preferred embodiment, the adhesive means comprises a non-drying and non-toxic adhesive applied to compartment-forming recessed areas of both elements.

In a preferred embodiment, the insect trap and monitor is manufactured of material such as solid, unbleached paperboard. The paperboard, preferably made with a high recycled content, in addition to providing structural strength to the trap, serves as a natural attractant for bed bugs.

In a further preferred embodiment, the insect trap and monitor is provided with at least one of monitoring means for at least partially exposing the trapping compartments. Monitoring means may comprise a tear-off flap which will allow for inspection of the interior of the trap before it is disposed.

BRIEF DESCRIPTION OF DRAWINGS

For a better understanding of the present invention, reference will be made, by way of example, to the accompanying drawings, wherein.

DETAILED DESCRIPTION OF THE INVENTION

Figure 1:
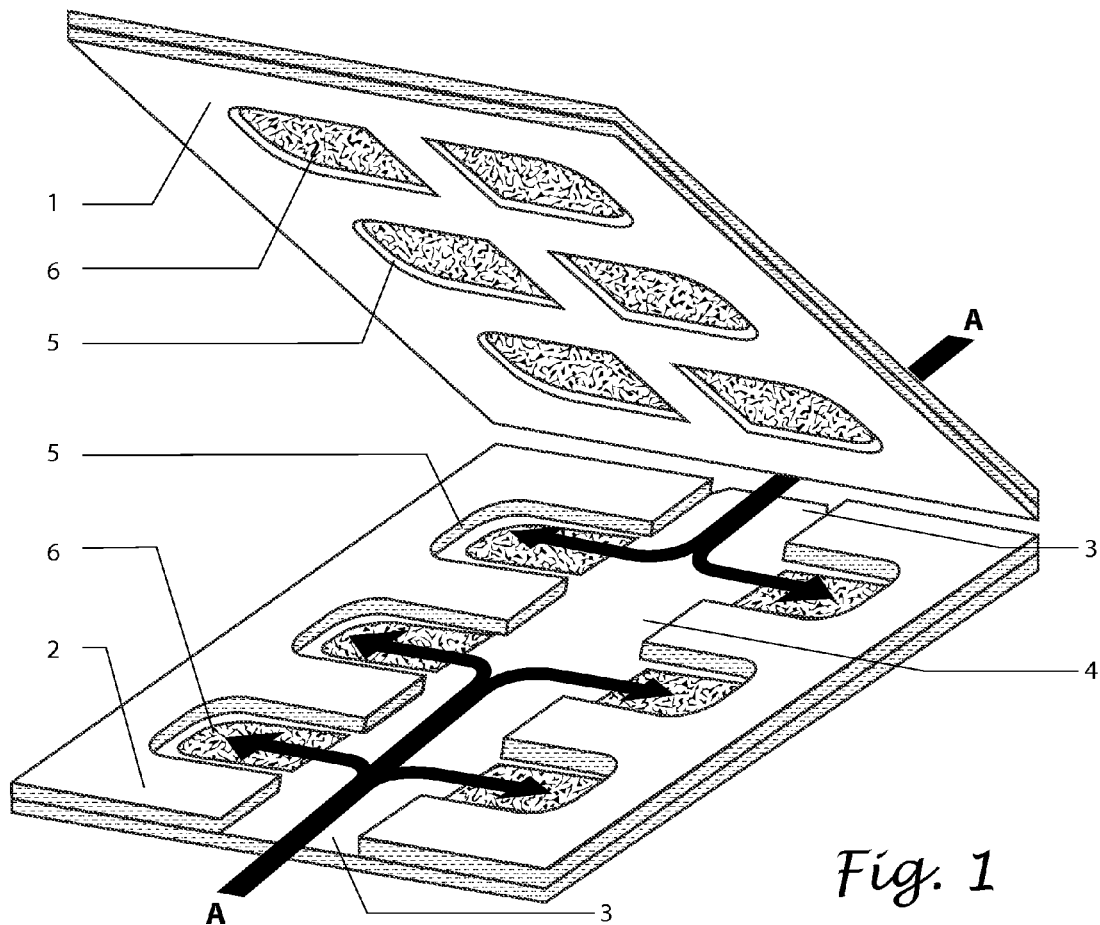
FIG. 1 shows a partially exploded view of the insect trap and monitor according to the invention.

The insect trap and monitor of the present invention, as illustrated in FIG. 1, comprises two generally planar elements, 1 and 2, shown in a partially exploded view to expose the interior. Each element comprises a substantially flat outer surface and an inner surface provided with a plurality of recessed areas, 4 and 5. Depending on materials and manufacturing techniques, recessed areas may be formed by layering die-cut sheets of flat material, embossing, or molding. In a preferred embodiment of the invention, the trap is specifically designed for bed bugs, which are known to have affinity for paper and paperboard. The material of choice will, therefore, be solid, unbleached paperboard, preferably manufactured with a high recycled content.

The top element 1 and the bottom element 2 are of substantially the same size and may, or may not, be identical. In either case, when the elements 1 and 2 are joined together along respective inner surfaces, the recessed areas of the top element 1 will be aligned with recessed areas of the bottom element 2 so as to form a plurality of passageways and compartments. It will be understood that terms "top" and "bottom," as used in this description, are for convenience only and refer to relative positions of elements in FIG. 1. The trap of the present invention will be efficient regardless of the orientation in which it is placed.

Studies of bed bug behavior have shown that their common hiding places include seams, recesses and crevices in wood, upholstery, boxes, or books. In a preferred embodiment of the invention, the trap emulates such environment by providing an enclosed volume of space, sufficiently large relative to insect size, where insects may freely move, explore and even attempt to nest. Referring back to FIG. 1, insects will enter the trap through one or more entrance areas 3 and move freely, generally in the direction of arrows A, through passageway area 4 towards a plurality of spaced-apart compartment areas 5. The compartment areas 5, in at least one and preferably in both of the elements 1 and 2, are provided with adhesive means 6 where the insects will be trapped. It is important to note that trapped insects remain out of the way of new insects entering the trap and moving away from entrance areas 3.

Adhesive means 6 may be selected from a range of adhesives available on the market, and may further include attractants such as insect pheromones, flavors and food components appropriate for targeted species. While present invention is not limited to any specific adhesive, the adhesive means according to a preferred embodiment of the invention will comprise a non-drying and non-toxic adhesive.

Adhesive traps known in the art typically comprise box-like structures in which the enclosed volume of space is maintained by providing side walls made of sheet material. While such a trap may have sufficient structural integrity when placed on the floor, in corners and low-traffic areas, it may be easily crushed when placed under a mattress, inside luggage or in articles of clothing. Crushing will cause enclosed volume of space to collapse and render the trap useless.

Conversely, the trap of the present invention is substantially non-collapsible, the structural integrity being maintained exclusively by layering of relatively rigid material such as paperboard. For purposes of this description, the term non-collapsible means that the trap will not be crushed when stepped on, under the weight of human body, or exposed to impacts involved in regular handling of luggage, books, boxes or articles of clothing.

FIG. 1 illustrates the trap of the present invention in one of the preferred embodiments, suitable for placement in beds and furniture. Other embodiments of the trap, to be used during travel, for placement in articles of clothing, or even as bookmarks, may differ in size, shape, or disposition of recessed areas. All such modifications will fall within the scope of the present invention.

In recent years, jurisdictions throughout North America have developed a wide range of regulations concerning treatment of bed bug infestation, particularly in fields of hospitality industry, public housing, student and military accommodations, and the like. A common requirement in these regulations is systematic detection and monitoring of infestation.

Figure 2:
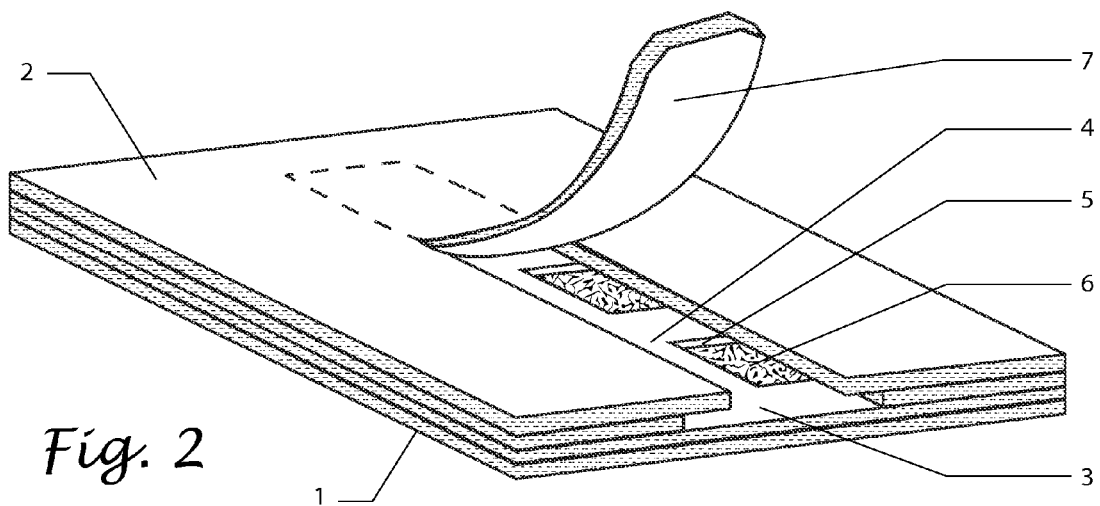
FIG. 2 shows the insect trap and monitor of the invention with the monitoring flap partially removed.

In a further embodiment of the present invention, therefore, the insect trap comprises means for monitoring the presence and severity of infestation. FIG. 2 illustrates the insect trap and monitor of the present invention where monitoring means comprise a tear-off flap 7. The flap 7 is partially removed to expose recessed areas of the entrance 3, passageway 4 and trapping compartments 5. In regular use, the trap will be placed in areas where infestation is suspected, removed at regular intervals, and the flap removed to allow for inspection before disposal.

Based on a positive proof of insect presence, authorities then may be in a position to order a more invasive treatment of infestation, such as application of heat or chemicals.

While the present invention has been described in reference to the preferred embodiments thereof, it will be apparent that various modifications of the insect trap an monitor may be made without departing from the spirit and scope of the invention as set forth in the appended claims.

The invention claimed is:

1. An insect trap comprising:
two planar elements of substantially the same size, each element comprising a substantially flat outer surface and an inner surface provided with a plurality of recessed areas,
the elements being arranged in opposed relation to each other and non-collapsibly joined together along the inner surfaces thereof, the recessed areas forming therebetween at least one passageway which extends along a longitudinal axis thereof and a plurality of trapping compartments extending laterally from the longitudinal axis,
wherein the recessed areas of the two planar elements are in communication with each other to form at least one of the plurality of trapping compartments,
wherein said at least one passageway is open at least at one end thereof to provide an entrance to the trap,
wherein the at least one passageway is completely devoid of adhesive,
wherein at least one of the trapping compartments is provided with adhesive for trapping the insects, and
wherein at least one of the trapping compartments is closed off except for access to the at least one passageway.

2. An insect trap as claimed in claim 1, wherein the recessed areas of the two planar elements are provided with adhesive for trapping the insects.

3. An insect trap as claimed in claim 1, wherein said elements are manufactured of solid paperboard.

4. An insect trap as claimed in claim 1, wherein said adhesive comprises non-drying adhesive.

5. An insect trap and monitor comprising:
   two planar elements of substantially the same size, each element comprising a substantially flat outer surface and an inner surface provided with a plurality of recessed areas,
   the elements being arranged in opposed relation to each other and non-collapsibly joined together along the inner surfaces thereof, the recessed areas forming therebetween at least one passageway which extends along a longitudinal axis thereof and a plurality of trapping compartments extending laterally from the longitudinal axis,
   wherein the recessed areas of the two planar elements are in communication with each other to form at least one of the plurality of trapping compartments,
   wherein said at least one passageway is open at least at one end thereof to provide an entrance to the trap,
   wherein the at least one passageway is completely devoid of adhesive,
   wherein at least one of the trapping compartments is provided with adhesive for trapping the insects,
   wherein at least one of the trapping compartments is closed off except for access to the at least one passageway, and
   wherein at least one of the elements is provided with a monitor for at least partially exposing said trapping compartments.

6. An insect trap and monitor as claimed in claim 5, wherein the recessed areas of the two planar elements are provided with adhesive for trapping the insects.

7. An insect trap and monitor as claimed in claim 5, wherein said elements are manufactured of solid paperboard.

8. An insect trap and monitor as claimed in claim 5, wherein said adhesive comprises non-drying adhesive.

9. An insect trap and monitor as claimed in claim 5, wherein said monitor comprises a tear-off flap for at least partially exposing the trapping compartments.

\* \* \* \* \*